July 24, 1962    J. R. BOLTER ET AL    3,045,895

GAS CIRCULATORY MEANS

Filed Jan. 22, 1958    3 Sheets-Sheet 1

United States Patent Office 3,045,895
Patented July 24, 1962

3,045,895
GAS CIRCULATORY MEANS
John R. Bolter and Richard H. Beaton, Newcastle-upon-Tyne, England, assignors to C. A. Parsons & Company Limited, Newcastle-upon-Tyne, England
Filed Jan. 22, 1958, Ser. No. 710,453
Claims priority, application Great Britain Jan. 30, 1957
1 Claim. (Cl. 230—120)

This invention relates to gas circulatory means and is concerned in the main with circulatory means suitable for use with gas cooled nuclear reactors although it is not limited to this use though it will mainly be described with reference thereto.

In the application of such circulators to nuclear reactors which form part of a nuclear power plant, large volumes of cooling gas need to be circulated through the reactor.

As a result, the ducts are large and thus problems of keeping the system gas tight are increased because of the large surfaces to be sealed. These problems are particularly acute around the gas circulators where, for maintenance purposes in respect of the circulators, the sealing joints must be broken at intervals.

In any circulatory system where power is absorbed in circulating the gas the pressure losses in the system should also be kept to a minimum.

The main object of the present invention is to provide a gas circulatory means suitable for use in nuclear power plant but subsidiarily of broader scope in accordance with paragraph 1 of this specification, in which circulatory means the sealing arrangements are simple and the pressure losses in the circulatory means are low.

The invention consists in gas circulatory means which comprise a chamber having an outer casing and an inner casing, the inner casing being spaced from the outer casing by an annular or other shape space, an axial flow gas circulator located in the inner casing at one end thereof and driven for instance by a shaft entering the inner casing at said end, an outlet for gas at the other end of said inner casing, an inlet for gas to said space between inner and outer casing, and a flow path for the gas from the aforesaid space to the end of the chamber in which the circulator is located and thence in a reverse direction through the circulator and the inner casing to said outlet.

The invention also consists in circulatory means in accordance with the preceding paragraph in which the circulator, comprising a rotor and a housing therefor, passes through an opening in one end of the chamber and a face of the housing forms a seal with a face on the wall of said chamber surrounding said opening.

The invention also consists in circulatory means in accordance with the preceding paragraph in which the circulator rotor has a frusto-conical face formed thereon which is capable of being moved into sealing contact with a similarly shaped face on the circulator housing by moving the said rotor in an axial direction when the circulator is at rest.

The invention also consists in circulatory means in accordance with the preceding paragraph in which when the rotor is moved into sealing contact with its housing an additional stationary seal is formed between a collar on the shaft supporting the said rotor and a rubber or other sealing ring located on the housing.

The invention also consists in circulatory means in accordance with the preceding paragraph in which the space between the two stationary seals can be scavenged.

The invention also consists in gas circulatory means in accordance with any of the preceding five paragraphs applied in a nuclear power plant in which heat developed in the reactor is removed by a cooling gas which is then circulated through a heat exchanger, in which heat exchanger said cooling gas heats the working fluid of mechanical power producing means, the circulatory means being motor or like driven and located at the lower end of the heat exchanger with the inlet opening of said circulatory means connected to the outlet for cooling gas from the heat exchanger and the outlet from said circulatory means being connected to the inlet for cooling gas to the reactor, the arrangement being such that the motor or the like driving said circulatory means is not located beneath the heat exchanger.

The invention also consists in circulatory means substantially as described below with reference to the accompanying diagrammatic drawings in which:

FIGURE 4 illustrates an arrangement of the circulatory means in a nuclear power plant.

Figure 1:
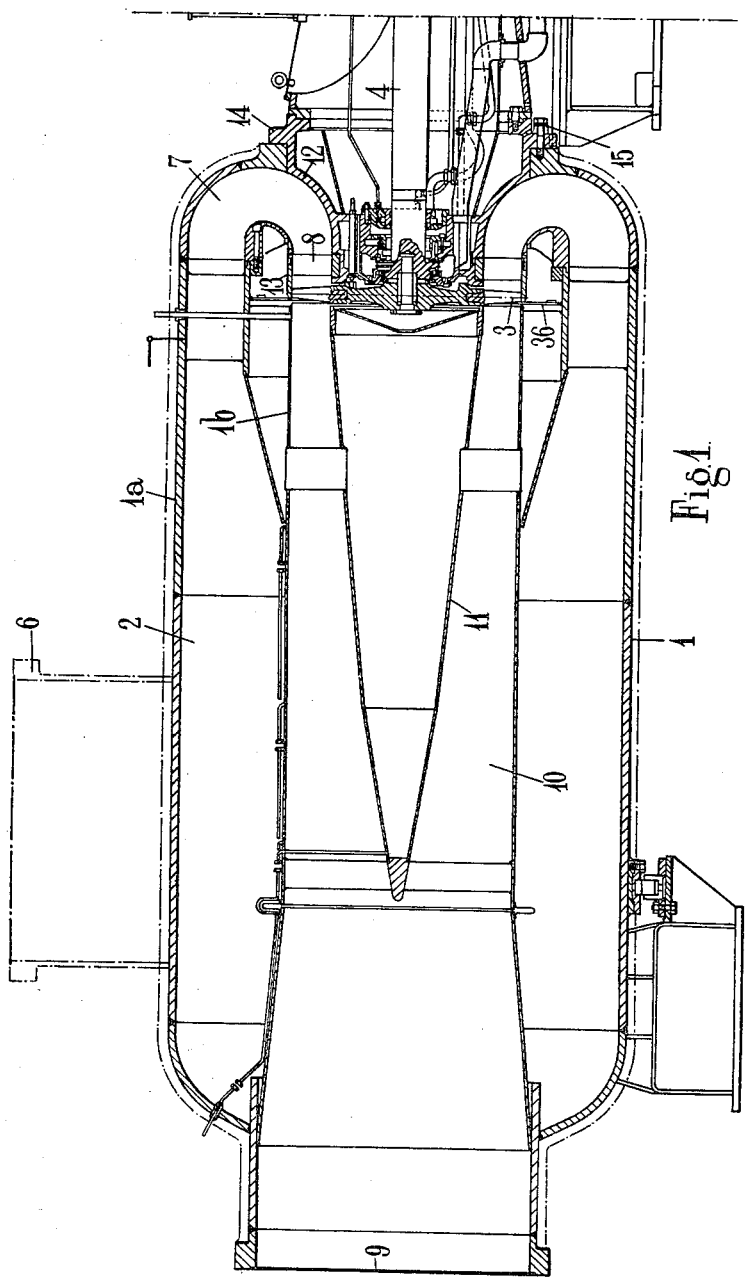
FIGURE 1 shows a longitudinal section through the driven end of circulatory means in accordance with one form of the present invention.
Figure 2:
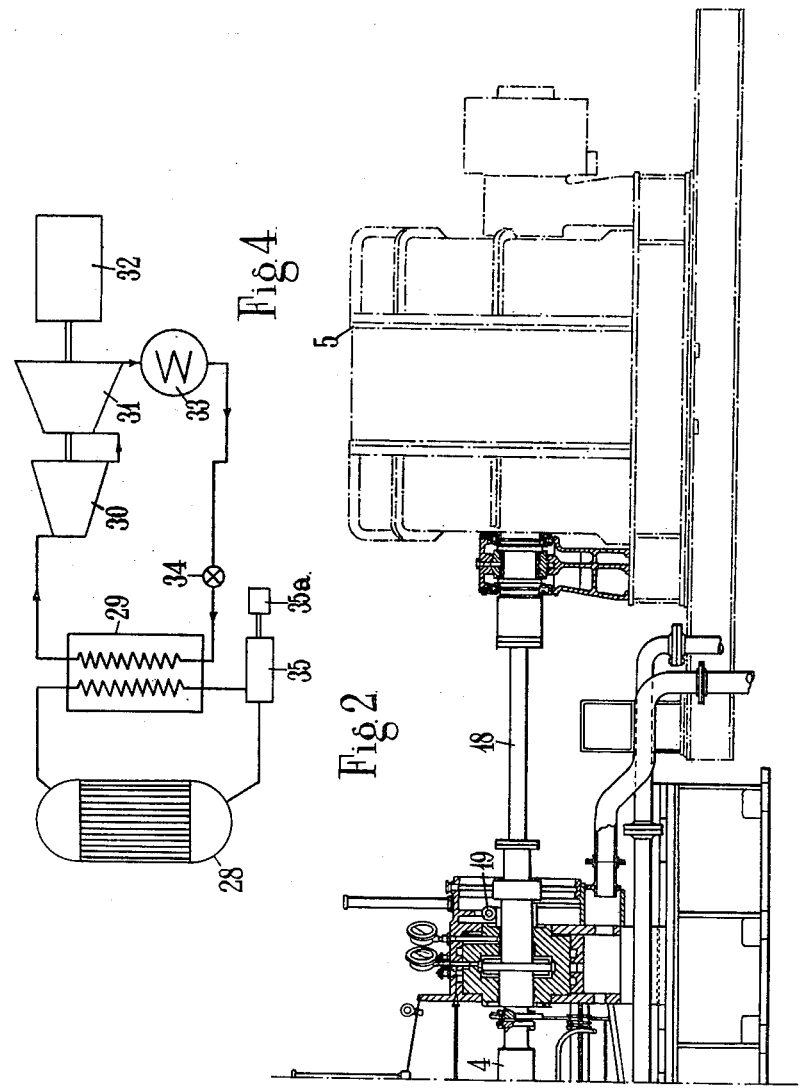
FIGURE 2 is a corresponding view to FIGURE 1 of the driving end.

In carrying the invention into effect in the form illustrated by way of example and referring to FIGURES 1 and 2, the circulatory means comprises a chamber 1 having an outer casing 1a and an inner casing 1b. Between the inner and outer casings is an annular space 2.

An axial flow circulator 3 is located in the inner casing 1b at one end thereof. The circulator is mounted on a shaft 4 which enters the chamber at the end where the circulator 3 is located said shaft being driven by an electric motor 5.

Gas is drawn into annular space 2 through inlet 6 in the outer casing 1a, flows towards the end of the chamber in which the circulator 3 is located and then suffers a reversal of flow in duct 7 before passing through stator vanes or blades 8 of the circulator 3. After leaving the circulator the gas flows through the inner casing 1b to an outlet 9.

The gas leaving the circulator is diffused in diffuser 10 formed by a cone 11 in the inner casing 1b.

The duct 7 is made up partly by circulator housing 12.

The circulator assembly which includes the stator blades 8 and shrouding 13 attached thereto, is inserted in the chamber 1 through a circular opening and the chamber 1 is made gas tight by the flange 14 of the circulator housing 12 being in sealing contact with a machined sealing face surrounding the circular opening in the chamber. Thus the whole circulator assembly can be removed from the chamber by the simple operation of removing nuts 15 and withdrawing the assembly in one piece. The only seal which needs to be broken is that made by flange 14.

The advantages of the arrangement described are that, as mentioned above, the circulator can easily be removed from the casing by breaking only one sealing joint, none of the ducting needing to be affected; good velocity distribution before and after the circulator is obtained by the reverse flow arrangement and pressure loss is kept to a minimum.

The arrangement also lends itself to the formation of a suitable standstill seal arrangement that is to say a seal which can come into operation when the circulator is stationary and the rotary shaft seal needs attention and maintenance. The use of such a standstill seal eliminates the necessity of depressurising the whole system to attend to the rotating shaft seal.

Figure 3:
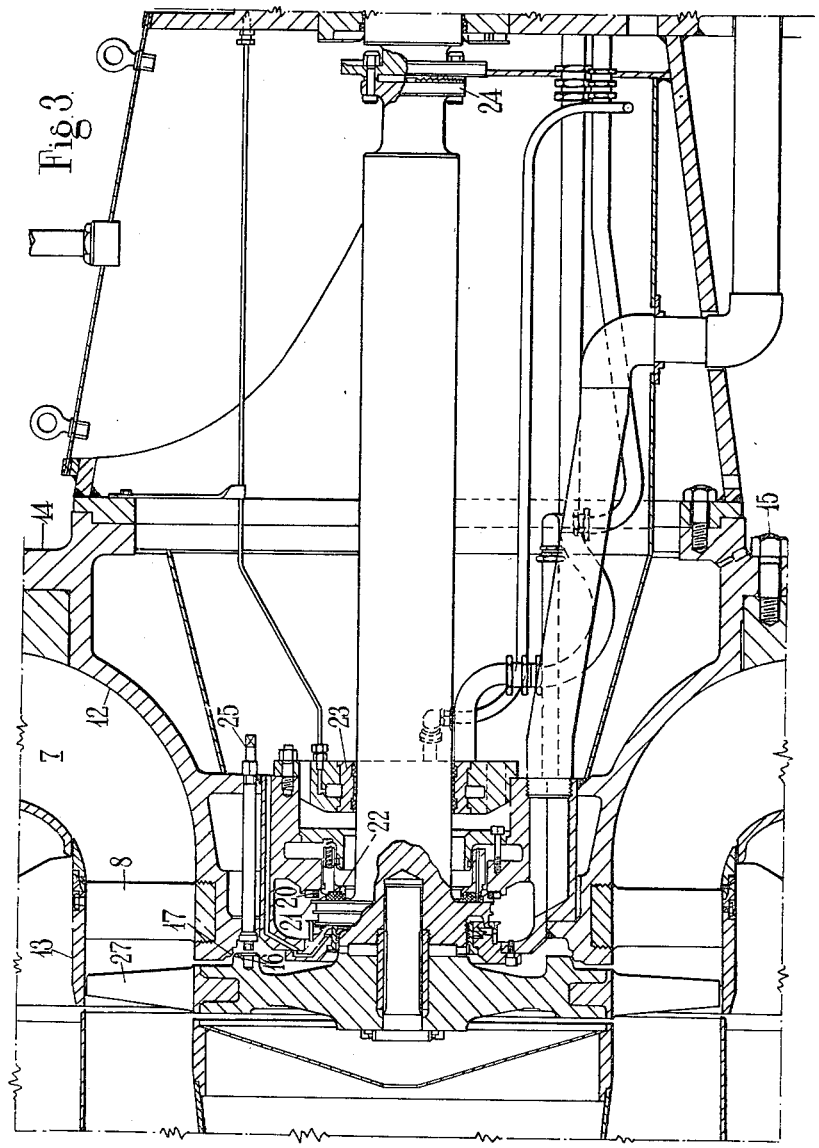
FIGURE 3 is an enlarged view of the part containing the axial flow circulator.

The construction of the standstill seal can better be seen by reference to FIGURE 3.

The rotor of circulator 3 has a frusto-conical sealing face 16 which can be brought into sealing contact with a similarly shaped face 17 on the circulator housing 12.

These sealing faces can be brought into contact by removing an extension shaft 18 (see FIGURE 2) and turning worm 19 which moves the shaft 4 axially for the short distance required to bring faces 16 and 17 into contact. If no parts need to be removed the axial movement required is small enough to be taken up by the shaft system without the need for removing the shaft 18.

When the sealing faces 16 and 17 are in contact a secondary standstill seal is formed between a rubber ring 20 and a shaft collar 21.

The space between the standstill seal 16, 17 and the seal 20, 21 can be scavenged if necessary to prevent any escape of gas from this space during maintenance or inspection operation.

A rotary shaft seal 22 or bearing 23 can be inspected or removed for maintenance without depressurising the system. If any parts of the bearing or rotary shaft seal need to be removed it is necessary to disengage coupling 24, but before this is done the circulator rotor is supported and locked in position by means of locking bolts 25.

The housing 12 supports the stator guide vanes 8 and attached to these vanes is the shroud ring 13 for rotor blades 27. This construction whereby the shroud ring is supported by the stator blades avoids complication of the casing structure to support a shroud ring.

FIGURE 4 shows the use of circulatory means, such as those described, in a nuclear power plant.

The plant comprises a nuclear reactor 28, a heat exchanger 29, turbines 30 and 31, electric generator 32, condenser 33, water pump 34 and circulatory means 35.

The reactor is cooled by a cooling gas such as carbon dioxide which is circulated through the heat exchanger where it gives up its heat to water, converting the water to steam. The steam then passes to turbines 30 and 31 where it is expanded before being condensed in condenser 33. The turbines drive the generator 32.

A motor 35a driving the circulator is not located beneath the heat exchanger, the circulator can be removed if necessary without interfering with the main duct work of the system.

Between the shroud 13 and the casing 1b is located a disc 36 which is made up in three or more arcuate sections which are adapted to be pressed against the casing 1b by the shroud 13 so as to form a seal.

We claim:

A gas circulatory means which comprise a chamber having an outer casing and an inner casing, the inner casing being spaced from the outer casing, an axial flow gas circulator located in the inner casing at one end thereof, and having a rotor, housing therefor and drive shaft for supporting and rotating the rotor, the said circulator passing through an opening in one end of the chamber and having means on a face of its housing forming a seal with the face on the wall of the said chamber surrounding the said opening, the circulator rotor having a frusto-conical face formed thereon which is capable of being moved into sealing contact with a similarly shaped face on the circulator housing by moving the said rotor in an axial direction when the circulator is at rest and the shaft having a collar and the rotor housing having a sealing ring cooperating therewith to form a seal when the rotor is so moved in an axial direction, an outlet for gas at the other end of the said inner casing, an inlet for gas to said space between inner and outer casing, and a flow path for the gas from the aforesaid space to the end of the chamber in which the circulator is located and thence in a reverse direction through the circulator and the inner casing to said outlet.

References Cited in the file of this patent

UNITED STATES PATENTS 2,698,128    Ault et al.    Dec. 28, 1954

FOREIGN PATENTS 543,770    Germany    Feb. 9, 1932
494,987    Great Britain    Nov. 4, 1938
631,069    Great Britain    Oct. 26, 1949
941,148    Germany    Apr. 5, 1956